United States Patent [19]

Schultz et al.

[11] Patent Number: 4,638,452

[45] Date of Patent: Jan. 20, 1987

[54] PROGRAMMABLE CONTROLLER WITH DYNAMICALLY ALTERED PROGRAMMABLE REAL TIME INTERRUPT INTERVAL

[75] Inventors: Ronald E. Schultz, Willoughby; Otomar Schmidt, Willoughby Hills; David A. Johnston, Mentor, all of Ohio

[73] Assignee: Allen-Bradley Company, Inc., Milwaukee, Wis.

[21] Appl. No.: 584,128

[22] Filed: Feb. 27, 1984

[51] Int. Cl.⁴ .............................................. G06F 15/18
[52] U.S. Cl. ................................................... 364/900
[58] Field of Search ... 364/200 MS File, 900 MS File

[56] References Cited

U.S. PATENT DOCUMENTS

| Re. 29,642 | 5/1978 | Kwiatkowski et al. | 364/900 |
|---|---|---|---|
| 4,040,021 | 8/1977 | Birchall et al. | 364/200 |
| 4,107,785 | 8/1978 | Seipp | 364/900 |
| 4,266,281 | 5/1981 | Struger et al. | 364/900 |
| 4,282,584 | 8/1981 | Brown et al. | 364/900 |
| 4,303,990 | 12/1981 | Seipp | 364/900 |
| 4,393,446 | 7/1983 | Gurr et al. | 364/200 |
| 4,509,851 | 4/1985 | Ippolito et al. | 364/200 |

OTHER PUBLICATIONS

Programmable Controller Handbook, Wilhelm, Jr., 1985.

*Primary Examiner*—Raulfe B. Zache
*Assistant Examiner*—C. H. Lynt
*Attorney, Agent, or Firm*—Barry E. Sammons

[57] ABSTRACT

A programmable controller includes a main processor which executes a user control program. The main processor is interrupted by a support processor which operates as a real time clock. The interval between interrupts is determined by instructions within the user control program and may be dynamically altered when required. The main processor executes a user created interrupt routine when each interrupt occurs.

3 Claims, 11 Drawing Figures

MAIN PROCESSOR
REAL TIME INTERRUPT
SERVICE ROUTINE

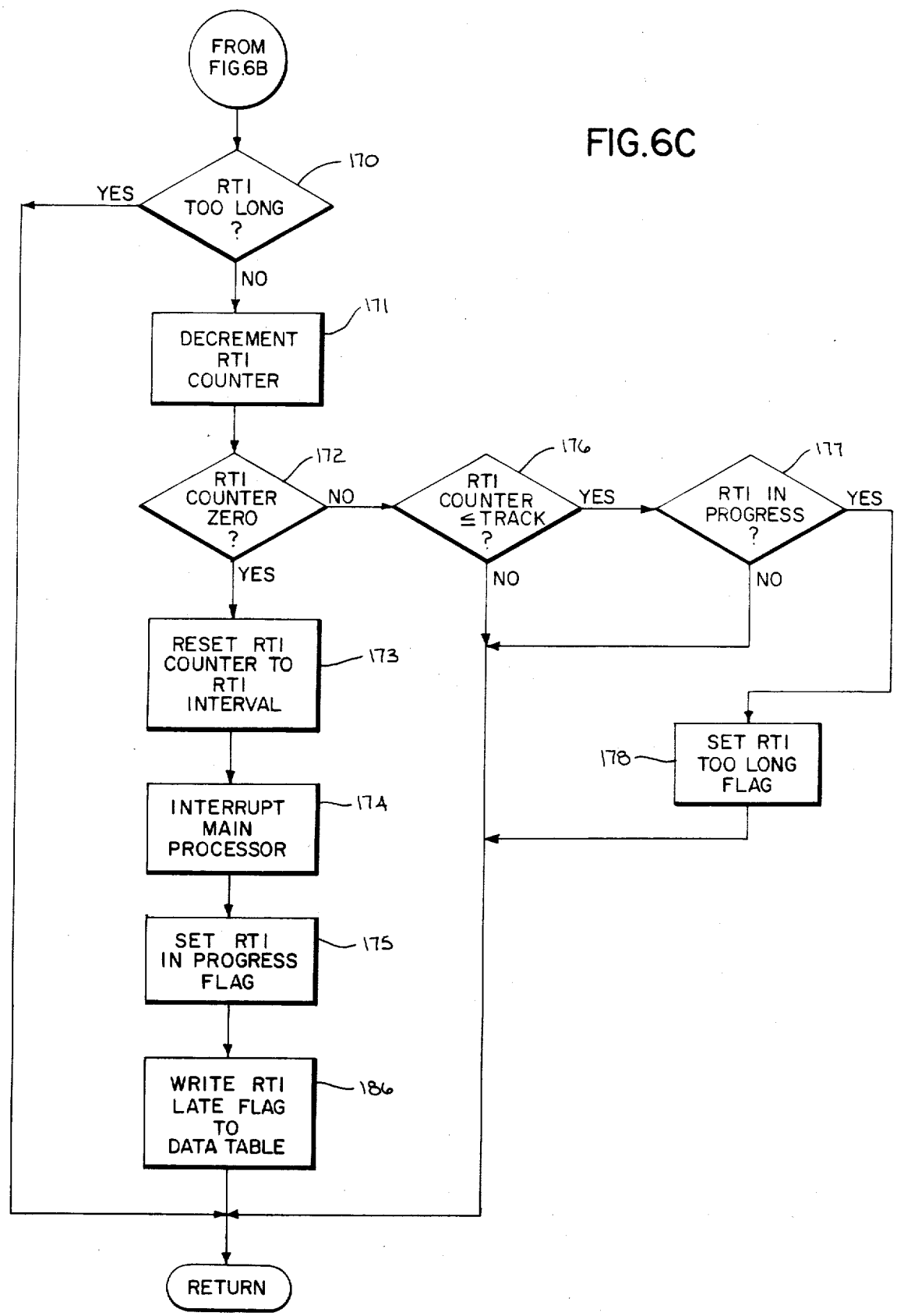

PROGRAMMABLE CONTROLLER WITH DYNAMICALLY ALTERED PROGRAMMABLE REAL TIME INTERRUPT INTERVAL

BACKGROUND OF THE INVENTION

The field of the invention is programmable controllers, and particularly, microprocessor-based programmable controllers such as those disclosed in U.S. Pat. No. 4,165,534 entitled "Digital Control System with Boolean Processor", U.S. Pat. No. 4,282,584 entitled "Mini-Programmable Controller", and U.S. Pat. No. 4,266,281 entitled "Microprogrammed Programmable Controller".

Since their inception, programmable controllers have been clearly distinguishable from other programmable processors by their instruction set, which is tailored to meet the specific needs of the control engineer. This instruction set provides a language which is easily understood and used by those who have heretofore designed systems of relays, switches and motors using ladder diagrams. Not only are programmable controller processors, such as those described in the above-cited patents, designed to execute this special purpose instruction set, but programming panels, or terminals, such as those disclosed in U.S. Pat. Nos. 3,798,612; 3,813,649; and 4,070,702 have been developed to facilitate the loading and editing of control programs using this instruction set.

The programmable controller and its instruction set are particularly well suited to interface with industrial equipment. The logic state of input signals received from input modules are examined during each scan through the user's control program to provide up-to-date information on the state of sensing devices connected to the input modules. In response to these inputs, the programmable controller generates signals to its output modules which connect to operating devices on the machines being controlled. The scan time, or in other words, the rate at which the programmable controller can execute the user's control program is very important in applications which employ high speed I/O devices on the machine being controlled.

Microprocessors are commonly used to perform the functions required of a programmable controller processor. The microprocessor is programmed to sequentially execute the user's control program by reading out each control program instruction and mapping to a corresponding interpreter routine which executes the instruction in the machine language of the particular microprocessor. While the more simple bit manipulation instructions can be quickly interpreted and executed in this manner, some of the more complex control program instructions, such as timers, arithmetic, and counters require considerable time. In some applications, therefore, they must forego the use of more powerful instructions for the sake of a faster scan time.

SUMMARY OF THE INVENTION

The present invention relates to a programmable controller having a real time interrupt capability which is controlled by the user's control program. More particularly, the present invention includes a memory for storing the user's control program and a user interrupt routine, a data table which stores a real time interrupt interval number which can be changed in response to control instructions in the user's control program, and a real time clock means for interrupting the execution of the user control program by the controller processor at intervals determined by the value of the stored real time interrupt interval number. When thus interrupted, the controller processor executes the user interrupt routine and then returns to the execution of the user control program.

A general object of the invention is to provide a real time interrupt which may be controlled by the user through the user control program. The user may include conventional programmable controller instructions in the user control program which test the state of the machine being controlled and which alter the interrupt time interval according to a desired strategy. For example, over a portion of the machine's operation the real time interrupt may be disabled, or programmed to occur very infrequently. However, over another portion of the machine's cycle, such as a very sensitive measurement operation, very short interrupt intervals may be enabled. In this latter case the user may write an interrupt routine to perform the measuring function and the user control program would be interrupted frequently when the machine performs this sensitive part of the operation.

Another object of the invention is to insure that the user does not unduly interfere with the normal operation of the programmable controller. If the user interrupt routine requires an excessive amount of time for its execution, the real time clock alters the "programmed" real time interrupt interval to allocate sufficient time for the controller processor to execute the user control program. Also, the user is notified of this event through a flag in the data table which may be examined by the user's control program.

Yet another object of the invention is to provide a support processor which performs the functions of the real time clock. The main processor which executes the user's control program periodically notifies the support processor of the desired interrupt interval. The support processor interrupts the main processor at the end of each interval, and it monitors the time which the main processor requires to service the interrupt. If the time is excessive as compared with the programmed interrupt interval, the next interrupt interval is lengthened. The support processor is also available to perform other functions such as updating the controller's time base and handling communications.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIGS. 6B and 6C are a flowchart of a real time clock interrupt service routine executed by the support processor of FIG. 2.

DESCRIPTION OF THE PREFERRED EMBODIMENT

Figure 1:
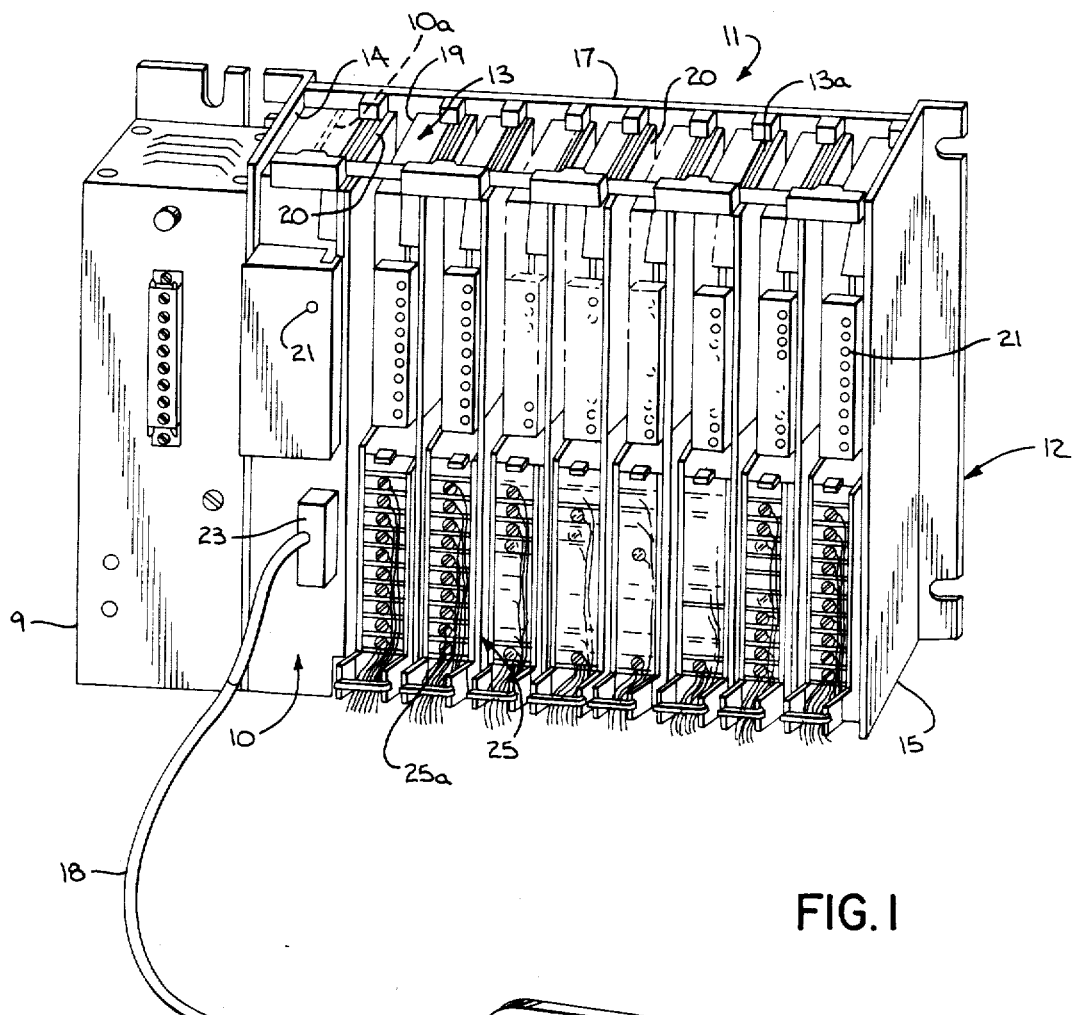
FIG. 1 is a perspective view of a programmable controller which employs the present invention.
Figure 1:
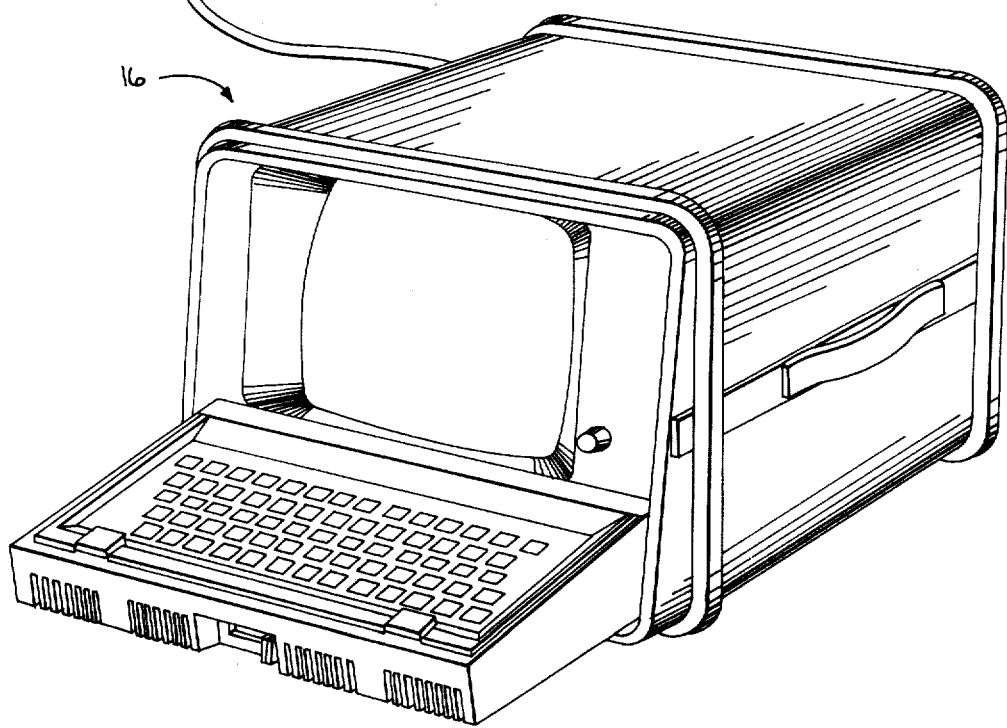

Referring to FIG. 1, the processor module 10 of the present invention is one of nine modules in a programmable controller 11 in which modules are carried upright in a side-by-side arrangement in a rack 12. Besides the processor module 10, there are eight I/O modules 13 confined between the spaced apart sidewalls 14 and 15 of the rack 12. The rack 12 may be of different sizes in other embodiments so that a greater or lesser number of I/O modules 13 may be included. A main power supply 9 is mounted on the left sidewall 14 and is connected to the processor module 10 through a short cable (not shown). The processor module 10 is electrically connected to the I/O modules 13 through a backplane motherboard 17 that extends across the back of the rack 12 from the left sidewall 14 to the right sidewall 15.

The processor module 10 and the I/O modules 13 are formed by one or more circuit boards 10a and 13a which carry electronic circuits that are partially enclosed within plastic covers 19 around the outside of the circuit boards 10a and 13a. The modules 10 and 13 slide into slots formed between upright, closely spaced barriers 20 in the rack 12, and in this position, their circuit boards 10a and 13a each present a back edge that engages an edge connector (not shown) mounted on the back plane motherboard 17. Columns of LED (light-emitting diode) status indicators 21 are mounted along an upper front edge of the I/O circuit boards 13a and a status indicator 12 is disposed on the upper front edge of one of the circuit boards 10a in the processor module 10. A pin-style connector 23 (not shown in FIG. 1) is positioned along the lower front edge of one of the processor circuit boards 10a and is connected to a programming terminal 16 through a cable 18. Wiring terminals 25a are disposed along connectors 25 that engage the lower front edges of the circuit boards 13a in the respective I/O modules 13. These connect through wires to I/O devices (not shown) of the type known in the art for controlling an industrial machine or process. Further details concerning the construction of the rack 12 are provided in Struger et al, U.S. Pat. No. 4,151,580, issued Apr. 24, 1979, and assigned to the assignee of the present invention.

The I/O modules 13 form an "interface" between the processor module 10 and the I/O devices. The I/O modules 13 are usually a mix of input modules and output modules that connect to input devices and output devices, respectively. Input modules are typically connected to devices such as photocells, limit switches, selector switches and pushbutton switches, so that signals from a group of these devices can be collected or multiplexed to form words of digital data that are read by the processor 10. Output modules are typically connected to devices such as solenoids, relays, motor starters and electrically controlled hydraulic valves. They receive words of digital data from the processor module 10 and distribute or demultiplex this data in the form of command signals for operating the output devices. In some embodiments, the I/O modules 13 may also convert between analog signals used by the I/O devices and digital signals recognized by the processor module 10, or they may perform other kinds of data conversion to interface the I/O devices to the processor module 10.

Figure 2:
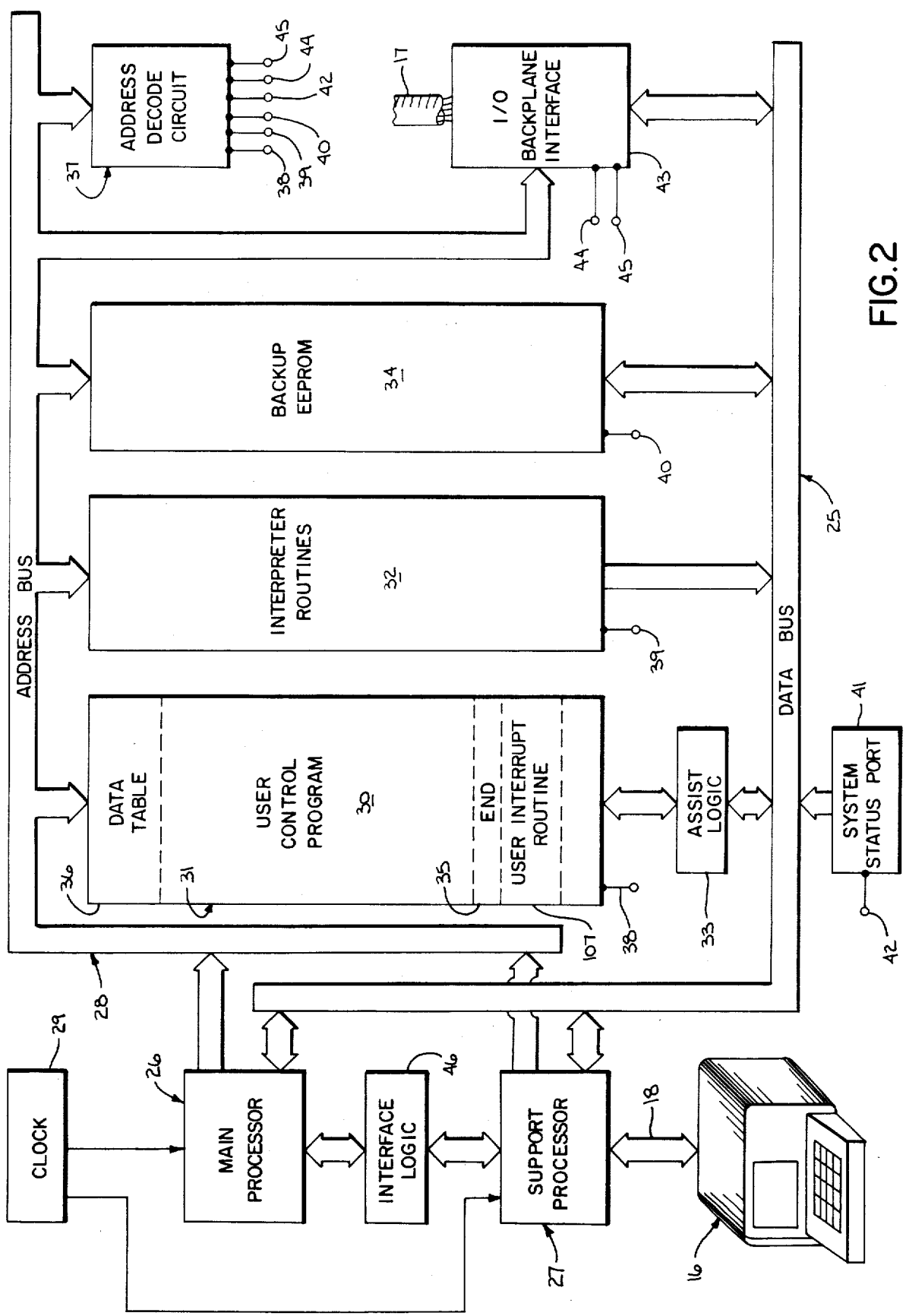
FIG. 2 is an electrical block diagram of the programmable controller of FIG. 1.

Referring to FIG. 2, the processor module 10 is structured about an 8-bit data bus 25 which connects to an 8-bit main processor 26 and an 8-bit support processor 27. The two processors 26 and 27 share the data bus 25 and an address bus 28, and they are both driven by a clock circuit 29. The main processor 26 executes a user control program 30 which is stored in a random access memory (RAM) 31 by reading the control program instructions and mapping their operation codes into the starting address of a corresponding interpreter routine. The interpreter routines are stored in a read-only memory (ROM) 32 and a hardware assist logic 33 is employed to speed up the mapping and interpreting operations. A more detailed description of the control program instruction set and the mapping and interpreting functions are provided in U.S. Pat. No. 4,282,584 entitled "Mini-Programmable Controller". An electrically erasable programmable read-only memory (EEPROM) 34 also connects to both the data bus 25 and address bus 28, and as described in U.S. Pat. No. 4,291,288 entitled "Programmable Controller With Data Archive", the contents of the RAM memory 31 are saved in the EEPROM 34 to protect against loss of data during a traumatic event such as a power loss.

The main processor 26 executes the user control program 30 in sequence until it reaches an "END" instruction indicated at 35. During this "scan" through the user control program 30, instructions are executed which examine the state of a data table 36 and which operate to change the state of this data table 36. A significant portion of the data table 36 is an image of the state of all the input and output devices which connect to the controller's I/O modules 13. When the END instruction 35 is executed at the end of each scan through the user control program 30, an I/O scan routine is executed which outputs the contents of the output portion of the I/O image table to the appropriate I/O modules 13, and which inputs current data from the I/O modules 13 and updates the state of the input portion of the I/O image table. The rate at which the I/O image table is updated, and hence the rate at which the operating devices connected to the controller are updated is determined by the length of time required to execute the user control program 30 during each scan.

Referring still to FIG. 2, the various elements of the processor module 10 are enabled when specific addresses are produced on the address bus 28. The addresses are decoded by a circuit 37 which enables the RAM 31 through a control line 38, which enables the ROM 32 through a control line 39, and which enables the EEPROM 35 through a control line 40. The address decoder 37 also operates a system status port 41 through a control line 42 and an I/O backplane interface circuit 43 through a pair of control lines 44 and 45. The system status port 41 is comprised of input buffers which receive signals from a variety of manually operable switches, and the I/O backplane interface 43 is comprised of a set of 3-to-8 decoders and a set of bi-directional data gates which couple the processor module 10 to the backplane bus 17. Table A is a map of the address space occupied by the elements of the processor module 10.

TABLE A

| DEVICE | MAIN PROCESSOR ADDRESS (HEX) | SUPPORT PROCESSOR ADDRESS (HEX) |
|---|---|---|
| RAM 31 | 00000-0FFFF | 00000-0FFFF |
| ROM 32 | 98000-9FFFF | |
| EEPROM 34 | 38000-3FFFF | |
| STATUS PORT 41 | 58000 | |
| I/O interface 43 | 580A1 & 580A0 | |
| INTERRUPT 8051 | 580E0 | |

As will now be described in more detail, the two processors 26 and 27 operate in parallel to perform the various programmable controller functions. An interface logic circuit 46 connects directly to each processor 26 and 27 and it controls which processor has access to the data bus 25 and the address bus 28. In general, the main processor 26 has control of the buses 25 and 28 and the support processor 27 periodically acquires control to update the values of timers in the data table 36. The support processor 27 also acquires control to read or write data into a transmit or receive buffer in the data table 36 and to thereby provide communications with the terminal 16.

Figure 3:
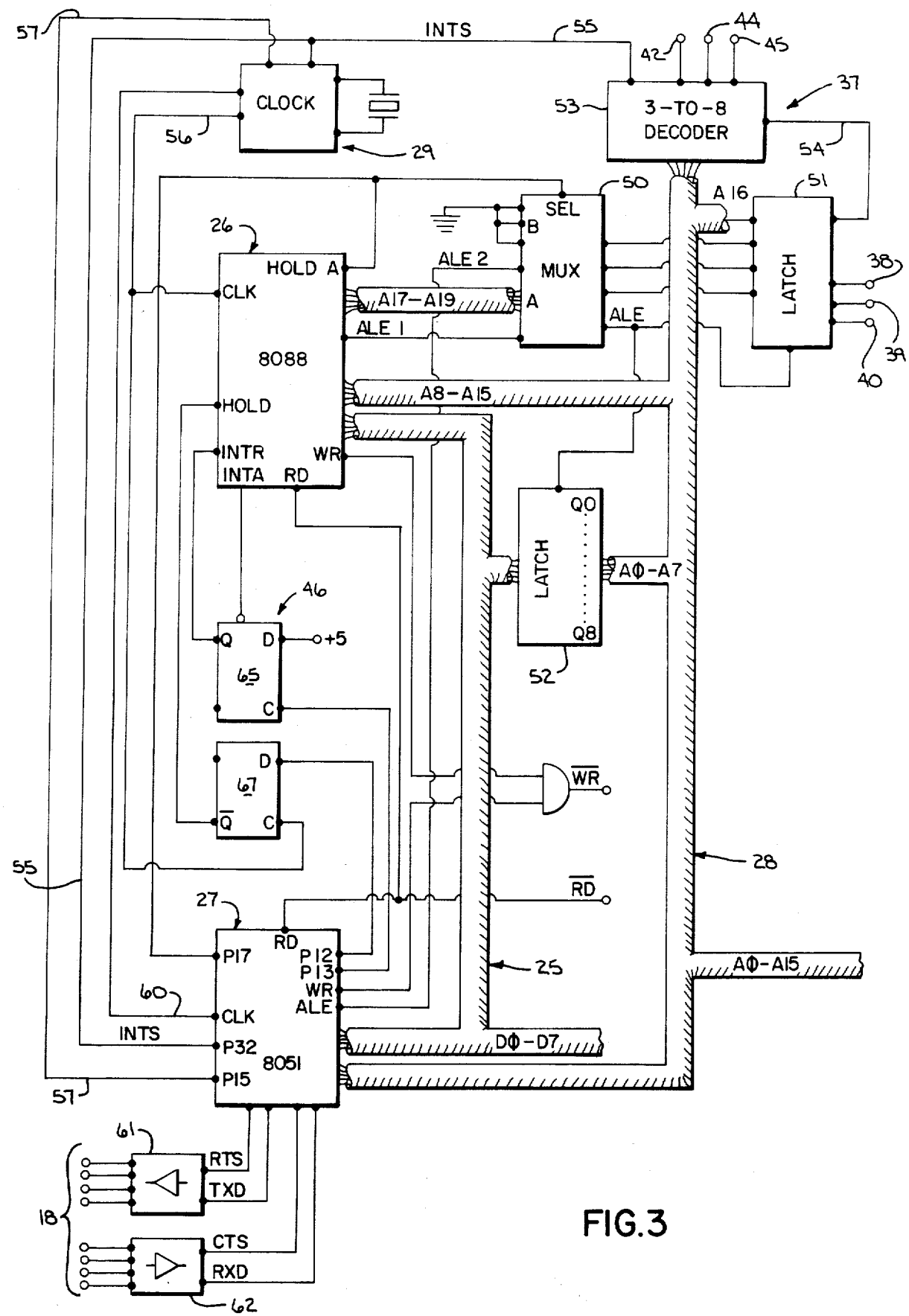
FIG. 3 is an electrical schematic diagram of a portion of the circuitry of FIG. 2.

Those portions of the processor module 10 which are most relevant to an understanding of the present invention are shown in more detail in FIG. 3. The main processor 26 is a model 8088 microprocessor manufactured by Intel, Inc. which has a set of terminals AD0–AD7 which connect directly to the data bus 25. A set of terminals A8–A16 connect directly to corresponding leads in the address bus 28, and three higher order address terminals A17–A19 connect to the "A" inputs on a 4-bit multiplexer 50. When the main processor 26 controls the buses, the state of the address leads A17–A19 are coupled through the multiplexer 50 to the inputs of a 4-bit latch 51. The main processor's address latch enable line (ALE1) is also coupled through the multiplexer 50 to enable both the 4-bit latch 51 and an 8-bit latch 52 when a valid address is present. The inputs of the 8-bit latch 52 connects to the data bus 25 to capture the eight least significant address bits A0–A7 which are generated thereon when the ALE1 control line is active.

The 4-bit latch 51 and a 3-to-8 line decoder 53 provide the enabling signals for the processor module's addressable elements. The latch 51 produces the enabling signals directly for the RAM 31, the ROM 32 and the EEPROM 34, and it produces an enabling signal through line 54 for the decoder 53. When thus enabled, the decoder 53 employs the address on leads A5, A6 and A7 of the address bus 28 to drive the control lines 42, 44 and 45 which enable the system status port 41 and the I/O backplane interface 43. In addition, when an interrupt request is made by the main processor 26, a control signal is generated by the decoder 53 on INTS control line 55. This control line 55 connects to the clock 29 and to an input P32 on the support processor 27. As will be explained in more detail below, this interrupt signal disables the clock signal produced on line 56 for the main processor 26 and it interrupts the operation of the support processor 27. In response, the support processor 27 is vectored to an interrupt routine which reads a command from the main processor 26. When the interrupt has been serviced, the support processor 27 generates a signal on line 57 which restarts the clock signal on line 56 and takes the main processor 26 out of the "wait" state.

Referring still to FIG. 3, the support processor 27 is a model 8051 microcomputer manufactured by Intel, Inc. It contains its own internal 4K × 8 read-only memory which stores the programs that it executes, and it contains a 128 × 8 random access memory which serves as a "scratch pad". The support processor 27 also contains two 16-bit timers which are driven by a clock signal received through line 60 from the system clock 29. Also, the support processor 27 contains a full-duplex serial I/O channel which outputs serial data to the terminal cable 18 through line drivers 61 and receives serial data therefrom through input buffers 62.

The support processor 27 connects directly to the data bus 25 and the address bus 28. Its leads P00-P07 connect to leads D0-D7 in the data bus 25 and its leads P20-P27 and P10 connect to respective leads A8–A16 in the address bus 28. The address latch enable control line (ALE2) connects to one input lead on the "B" port of the multiplexer 50, and when the support processor 27 has control of the buses, it controls the latches 51 and 52 through this control line.

The support processor 27 may either interrupt the operation of the main processor 26 or it may stop, or "hold", the main processor 26. An interrupt request is generated at output P13 and is applied to the clock terminal of a D-type flip-flop 65. The Q output of this flip-flop 65 connects to an interrupt request input (INTR) on the main processor 26 and the main processor 26 acknowledges the interrupt by resetting the flip-flop 65 through an interrupt acknowledge output (INTA).

When the support processor 27 wants control of the buses 25 and 28, it places the main processor 26 in a hold state. The hold request is generated at output P12 and is applied to the "D" input of a second D-type flip-flop 67. On the next clock pulse a hold signal is produced by the flip-flop 67 and applied to a HOLD input on the main processor 26. The main processor 26 relinquishes control of the buses 25 and 28 by placing its outputs in a high impedance state. The main processor 26 also generates a hold acknowledge signal at its output HOLDA which is applied to the P17 input of the support processor 27 and the select terminal (SEL) on the multiplexer 50. The support processor 27 may now read and write data to the RAM memory 31. When it is finished, the hold request signal at the P12 output of the support processor 27 is removed and the flip-flop 67 resets on the next clock pulse to remove the hold request from the main processor 26. The main processor 26 resumes operation and the multiplexer 50 is switched back to accept addresses from it.

Figure 4A:
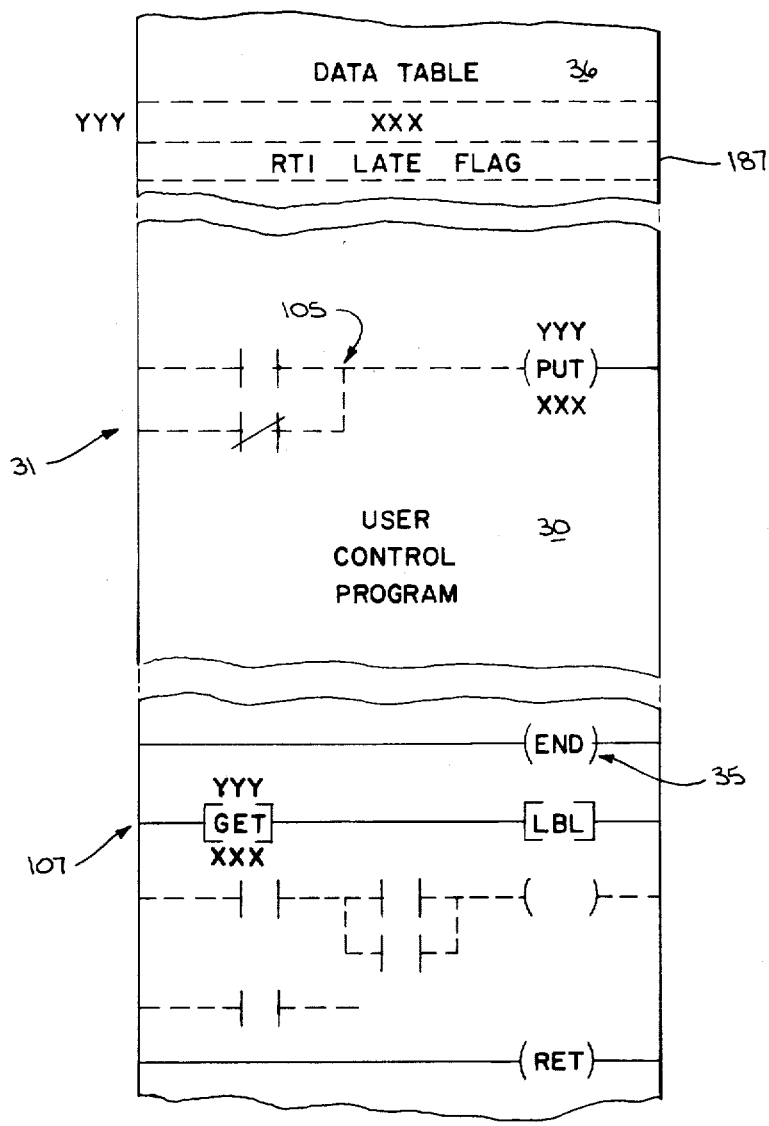
FIGS. 4A and 4B are schematic representations of data structures in the programmable controller of FIG. 2.
Figure 5A:
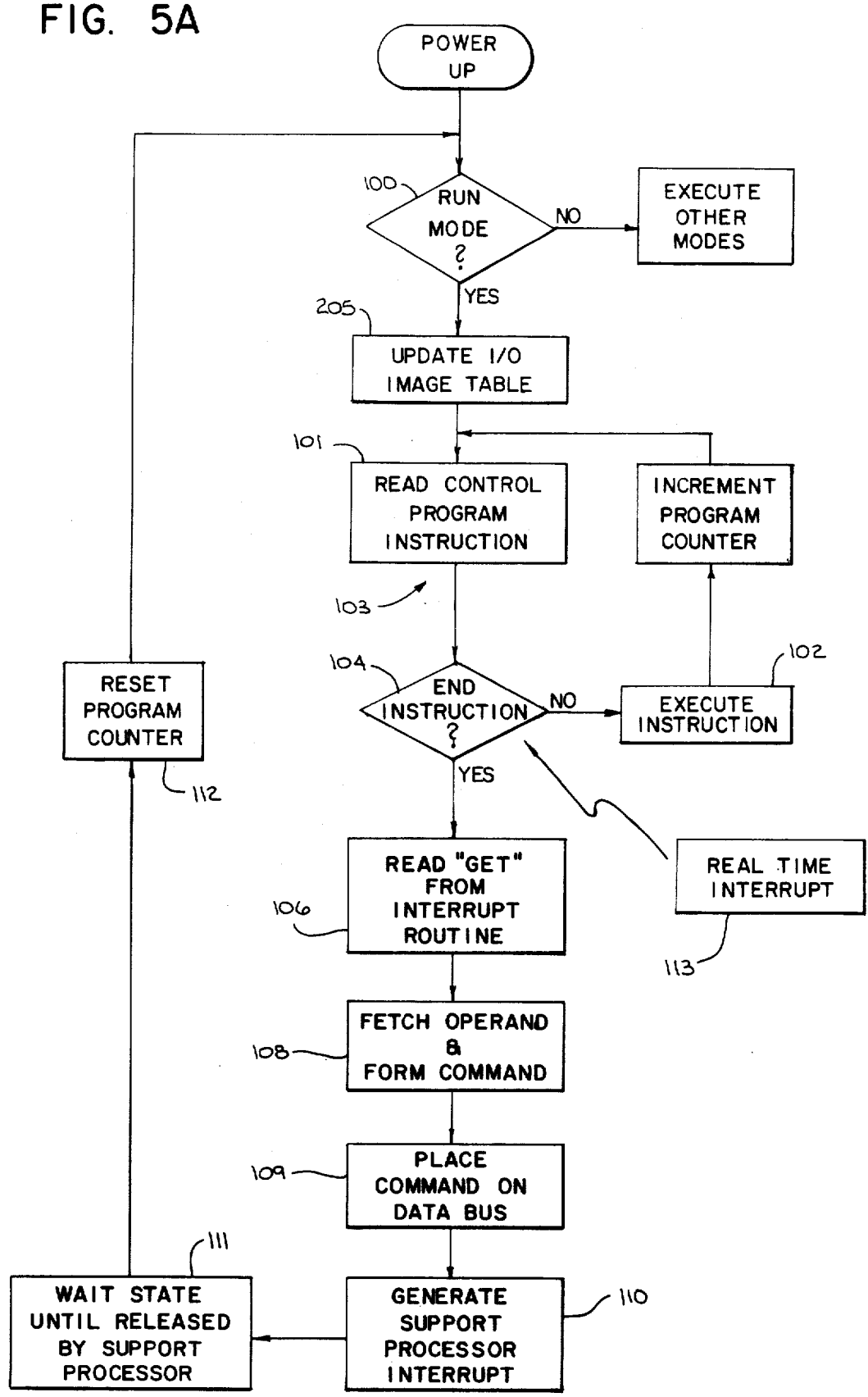
FIG. 5A is a flowchart of the background program executed by the main processor which forms part of FIG. 2.

Referring particularly to FIGS. 4A and 5A, the main processor 26 executes the user control program 30 stored in the RAM 31. After the main processor 26 is powered up, a set of instructions indicated by decision block 100 is executed to determine if the programmable controller is in the "RUN" mode. If it is, the I/O image portion of the data table 36 is updated as indicated at process block 205. This "I/O scan" includes instructions which output data to the I/O modules and instructions which input the current state of all sensing devices connected to the programmable controller. Following the I/O scan, the first instruction in the user control program is read from the RAM 31, as indicated by process block 101, and it is executed at process block 102 by executing the corresponding interpreter routine in the ROM 32. A loop is established at 103 in which further control program instructions are read from the RAM 31 and executed until the "END" instruction is detected at decision block 104.

As shown in FIG. 4A, the user control program 30 may contain a set of control program instructions indicated symbolically by the ladder diagram rung 105 which stores (PUT) a value (XXX) in the data table 36 at a designated location (YYY) when a set of conditions have been met. The conditions and the value (XXX) may be selected by the user when he develops his control program and more than one such rung may be present. As will become apparent from the description below, this feature enables the user to determine within his control program the rate at which real time interrupts will occur.

Referring still to FIGS. 4A and 5A, when the END instruction is detected at decision block 104, a series of functions are performed before looping back to the beginning of the user control program. First, instructions are read from the RAM 31 until a "GET" instruction is found, as indicated by process block 106. This instruction is the start of the interrupt routine 107 located immediately after the END instruction. The GET instruction identifies the data table location (YYY) of the interrupt time interval (XXX). As indicated at process block 108, the interrupt time interval (XXX) is then read from the data table 36 and an 8-bit command is formed by the main processor 26 for transmission to the support processor 27. This command is placed on the data bus 25, as indicated at process block 109, and the main processor 26 then generates an interrupt request at 110 to the support processor 27 on the INTS control line 55 (FIG. 3). Table B is a list of the time interval valves (XXX) in milliseconds and the corresponding hexadecimal representations of the 8-bit commands.

TABLE B

| Time interval value (milliseconds) | Command byte (hexadecimal) |
|---|---|
| 1-9 | 22, 24, 26, 28, 2A, 2C, 2E, 30, 32 |
| 10 | 34 |
| 20 | 36 |
| 50 | 38 |
| 0 (disable interrupt) | 20 |

As will be explained in more detail below, the support processor 27 places the main processor 26 in a "wait" state while it reads the command byte from the data bus 25. As indicated by process block 111, the support processor 27 then releases the main processor 26 from the wait state and the main processor 26 executes a set of instructions indicated by process block 112. The control program counter is reset to the start of the user control program 30 and the system loops back to repeat the entire sequence.

While the main processor 26 is performing the above-described functions it is periodically interrupted by the support processor 27 as indicated by the block 113 in FIG. 5A. In response to this interrupt, the main processor 26 is vectored to an executes a real time interrupt service routine which is shown in FIG. 5B.

Figure 5B:
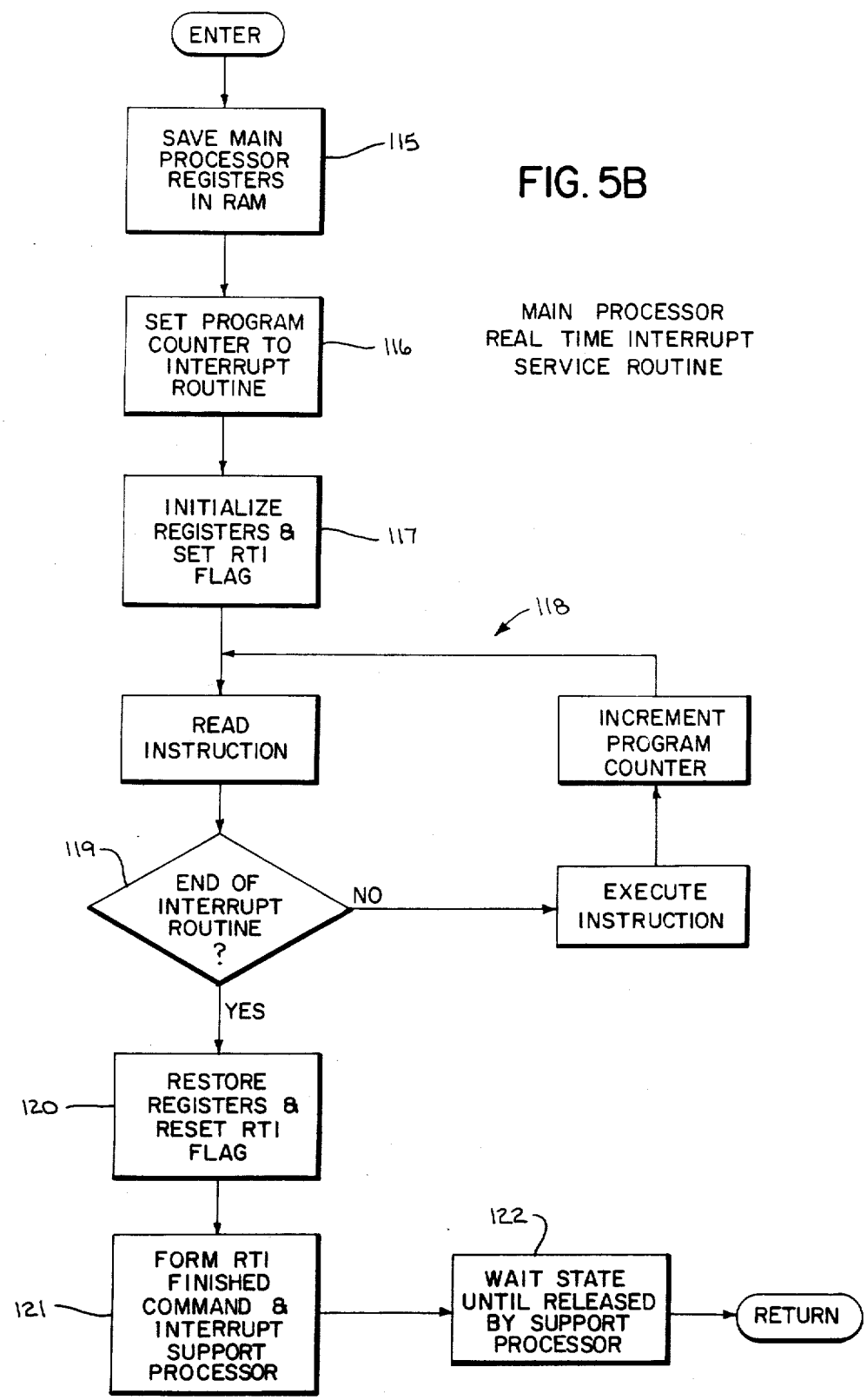
FIG. 5B is a flowchart of the interrupt service program executed by the main processor of FIG. 2.

Referring particularly to FIGS. 4A and 5B, when the main processor 26 is interrupted it saves its internal registers in the RAM 31 as indicated at process block 115. The program counter is then set at process block 116 to read the first instruction from the user's interrupt routine 107. The processor's registers are initialized, an RTI flag is set at process block 117, and a loop 118 is entered in which the user-created interrupt routine 107 is executed. This interrupt routine 107 employs the same instruction set as the user control program 30 and it is executed in the identical fashion by the main processor 26. When an "RET" instruction is encountered, however, the loop 118 is exited at decision block 119 and the main processor's registers are restored at process block 120. The RTI flag is also reset and, as indicated at process block 121, an "RTI finished" command is formed for transmission to the support processor 27. This 8-bit command (3A hexadecimal) is applied to the data bus 25 and the support processor 27 is interrupted through INTS control line 55. As indicated by process block 122, after the support processor 27 reads the command it releases the main processor 26 from the wait state and the main processor 27 returns to the processing from which it was interrupted.

From the above description it should be apparent that the programmable controller of the present invention includes means for storing data which indicates the rate at which the real time interrupts are to occur. The user may include instructions in his control program which change the stored rate data and means are provided for periodically outputting a command to the support processor which indicates the desired interrupt rate. As will become apparent from the description below, one function performed by the support processor 27 is that of a programmable timer which receives the interrupt rate command and in response thereto, produces interrupt requests to the main processor 26 at the commanded rate.

Figure 6A:
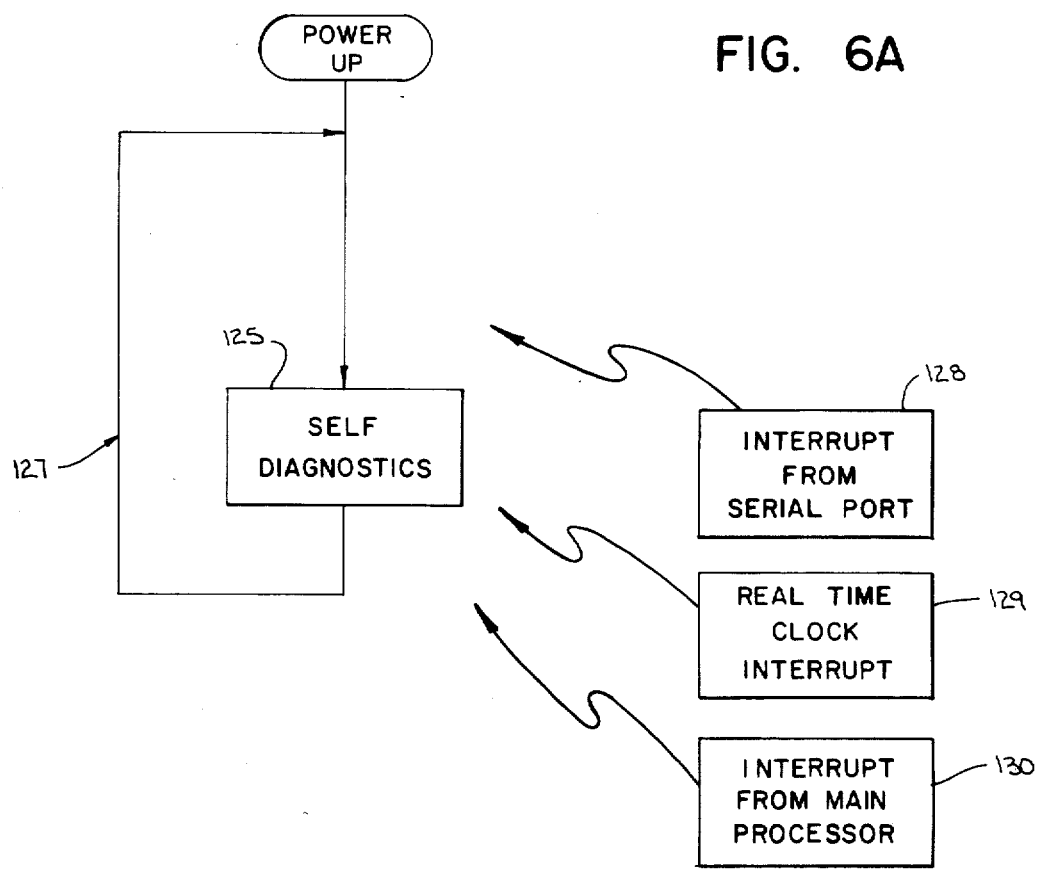
FIG. 6A is a flowchart of the background program executed by the support processor which forms part of FIG. 2.

Referring particularly to FIG. 6A, after the support processor 27 powers up it executes machine language program instructions in its internal read-only memory (not shown in the drawings). Instructions indicated by decision block 125 are executed to perform a number of self-diagnostic functions. The support processor 27 loops at 127 to repeatedly execute these relatively simple background functions. These background functions are, however, interrupted by any of three sources. First, when a character is received at the serial input port from the programming terminal 16, or if a character is ready to be transmitted to the terminal 16, a serial port interrupt occurs, as indicated by process block 128. In such case the support processor 27 interrupts its background activities and services the serial port.

Figure 6B:
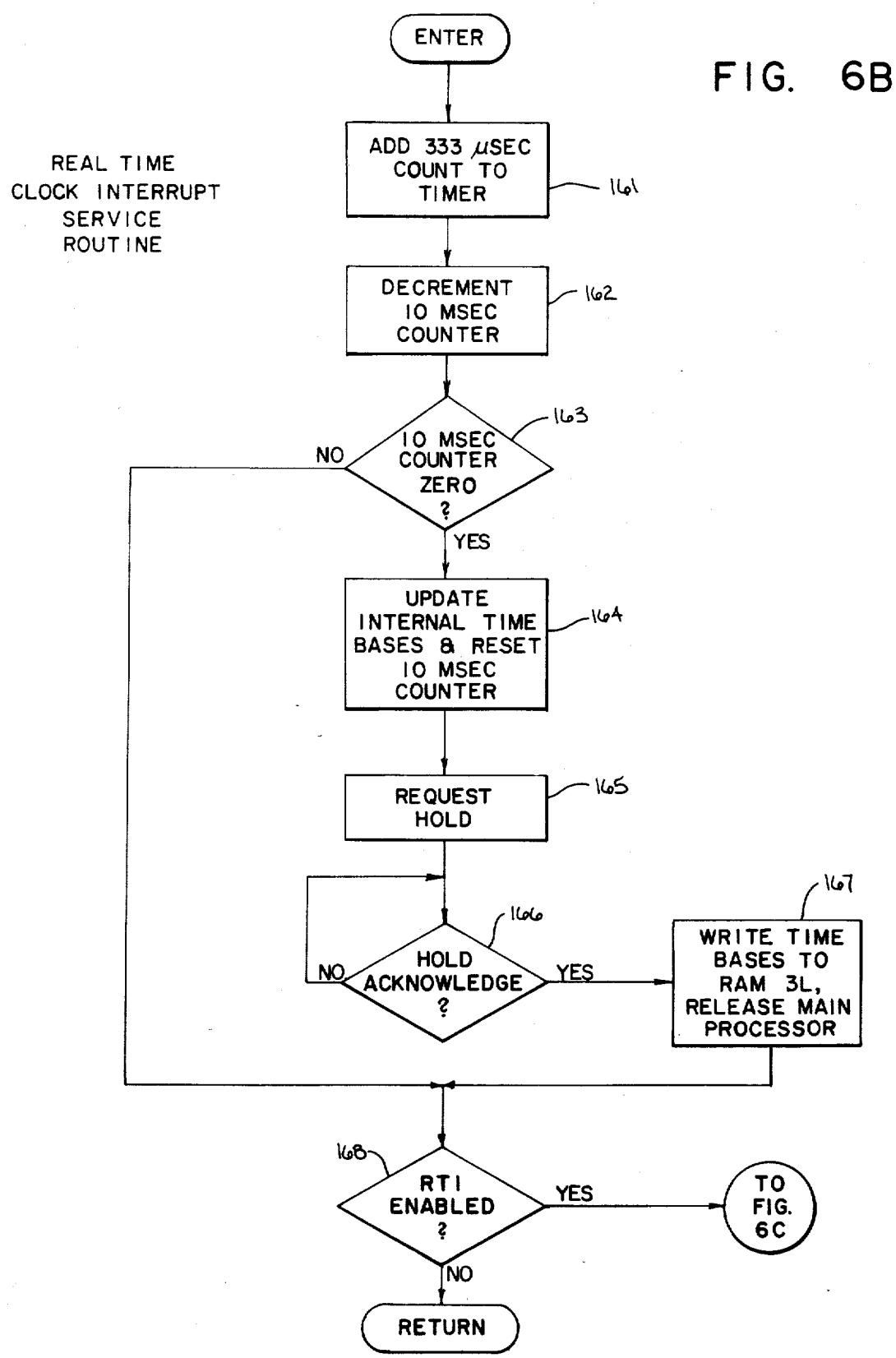

The second source of interrupts is from the internal real time clock as indicated by process block 129. In this case the support processor executes a real time clock interrupt service routine which is shown in FIGS. 6B and 6C. And finally, the support processor 27 may be interrupted from its background activities by an interrupt from the main processor 26 when it issues a command. The support processor 27 services this interrupt by executing a main processor service routine indicated generally by process block 130 and shown in detail in FIG. 6D.

Figure 4B:
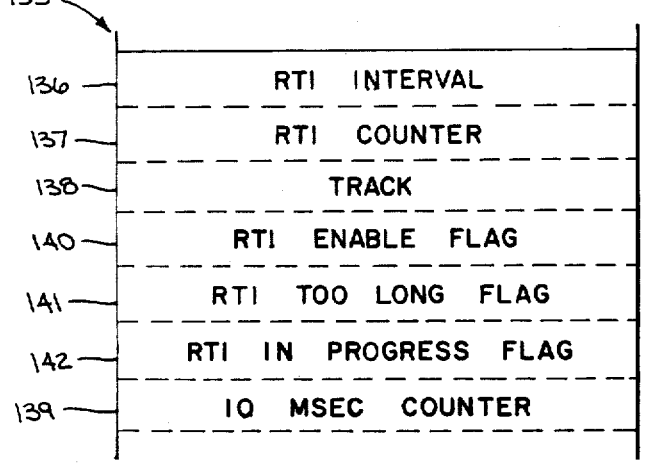

Referring particularly to FIG. 4B, the support processor 27 includes an internal timer (not shown in the drawings) which is preset to a value of 333 microseconds and which produces the real time clock interrupt when the system clock decrements the timer to zero. The support processor 27 also includes an internal scratch pad random access memory 135 which stores a number of data structures required by the interrupt service routines. For example, the RAM 135 stores an RTI interval number 136 which indicates the commanded time interval between real time interrupts. An RTI counter 137 is set to the number of 333 microsecond counts in this RTI interval and it is decremented during each real time clock interrupt. A "track" number is stored at 138 and it has a value equal to one-third the RTI interval number. A 10 millisecond counter 139 is also stored in the memory 135 and it is preset to measure a ten millisecond time interval. Three flags 140-142 are also stored in the memory 135 to indicate the state of the support processor 27.

Figure 6D:
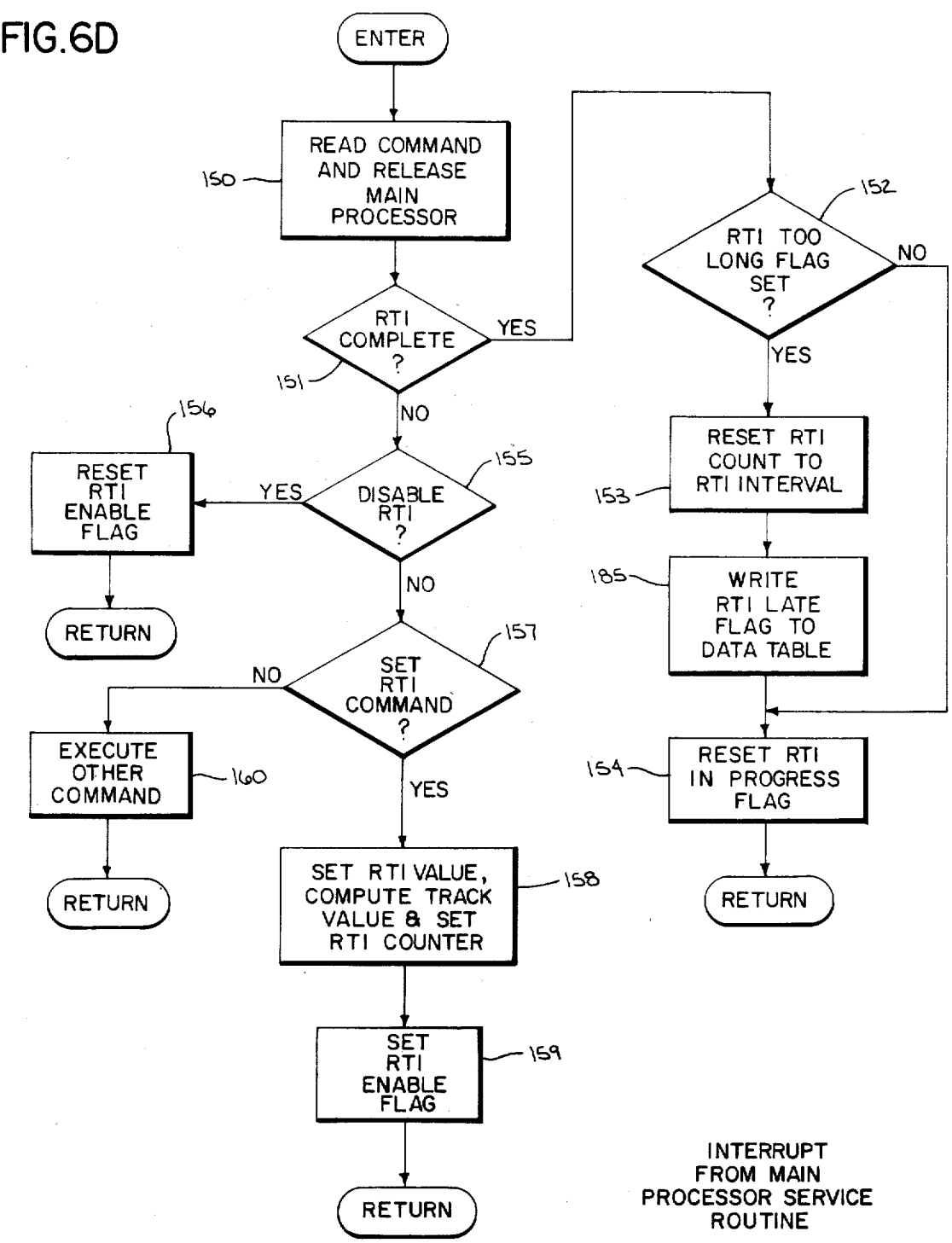
FIG. 6D is a flowchart of an interrupt service routine which is executed by the support processor when it receives a command from the main processor of FIG. 2.

Referring particularly to FIGS. 4B and 6D, when a command byte is sent to the support processor 27 by the main processor 26, the support processor services the resulting interrupt by reading the command from the data bus 25 and releasing the main processor from the wait state as indicated at process block 150. The command byte is then analyzed at decision block 151 and if the command indicates that the main processor 26 has completed executing the interrupt routine 107 (3A hexadecimal), the system branches. A set of instructions indicated by process block 152 are then executed to test if the "RTI TOO LONG FLAG" 141 has been set. As will be described below in more detail, this flag 141 is set when the interrupt routine 107 requires more than two-thirds of the total RTI time interval to execute. When this occurs, there is very little time remaining before the next RTI interrupt will occur, and thus, very little time is allowed for the main processor 26 to perform its other functions such as executing the user control program 30. Accordingly, as indicated at process block 153, the RTI counter 137 is reset to the RTI interval 136 to insure that the main processor 26 spends at least some percentage of its time on functions other than servicing the real time interrupt. In addition, an "RTI LATE FLAG" 187 in the data table portion of the RAM 31 is set at process block 185. This flag 187 may be examined by instructions in the user's control program 30 or the user interrupt routine 107. The "RTI IN PROGRESS" flag 142 is then reset at process block 154 and the interrupt is terminated.

Referring still to FIGS. 4B and 6D, if the support processor 27 receives a disable RTI command (20 hexadecimal) from the main processor 26, the system branches at decision block 155. The "RTI ENABLE FLAG" 140 is reset at process block 156 and the interrupt is terminated. On the other hand, if the command byte is a set RTI command (22-38 hexadecimal), the system branches at decision block 157. In such case, a set of instructions indicated by process block 158 are executed to set the RTI interval 136 to the value indicated by the command. Also, the value of TRACK is computed as one-third the value of the RTI interval and the RTI counter 137 is set for a full interval. As indicated at process block 159, the RTI ENABLE FLAG 140 is then set and the routine returns to the background program.

To support processor 27 is also responsive to a variety of other commands from the main processor 26. These other commands are processed at block 160.

As indicated above, the real time clock in the support processor 27 generates an interrupt every 333 microseconds. Referring particularly to FIGS. 4B and 6B, the first function performed by the routine 129 which services this interrupt is to add a count at process block 161 to the real time clock which will cause it to interrupt processing again in another 333 microseconds. The 10 millisecond counter 139 is then decremented one count at process block 162 and a check is made at decision block 163 to determine if 10 milliseconds has elapsed. If so, the time bases internal to the support processor 27 are updated at process block 164 and the 10 millisecond counter 139 is reset to thirty (10 msec/333 u sec). The support processor 27 then generates a hold request at process block 165 for the main processor 26. When the hold acknowledge reply is received, as determined at decision block 166, the support processor 27 takes control of the address bus 28 and the data bus 25 and writes the updated time bases to the RAM 31 as indicated at process block 167. These time bases are employed by the main processor 26 to implement timer instructions in the user control program 30 as described in U.S. Pat. No. 4,266,281. The main processor 26 is then released from its hold state by resetting the flip-flop 67 (FIG. 3).

After the time bases are updated, a test is made at decision block 168 to determine if the real time interrupt feature is active. If not, the system returns to the support processor background programs.

Referring particularly to FIGS. 4A, 4B, and 6C, if the real time interrupt feature is enabled, a check is made at decision block 170 to determine if the RTI TOO LONG flag 141 has been set. If so, this indicates that the main processor 26 is still executing the interrupt routine 107 and it has taken more than two-thirds of the interrupt interval to do so. In such case, there is nothing further to do, but wait until an RTI complete command is received from the main processor (FIG. 6D).

If, on the other hand, the RTI TOO LONG flag 141 is not set, the RTI counter 137 is decremented at process block 171 and a test is made at decision block 172 to determine if it has reached zero. If so, the interrupt interval has expired, and as indicated by process blocks 173 and 174, the RTI counter 137 is reset to a full RTI interval and the main processor 26 is interrupted by clocking the flip-flop 65 (FIG. 3). As indicated at process block 175, the RTI IN PROGRESS flag 142 is then set to indicate that the main processor 26 is executing the interrupt routine 107. In addition, the RTI LATE FLAG 187 is reset at process block 186 to indicate to the user control program that the interrupt was serviced in a timely manner.

Referring still to FIGS. 4A, 4B, and 6C, if the RTI counter 137 has not reached zero at decision block 172, a comparison is made between the time remaining in the current interrupt interval and the value stored in TRACK 138. If it is less as determined at decision block 176, the RTI IN PROGRESS flag 142 is checked at 177 to determine if the main processor 26 is still processing the previous interrupt. If it is, the RTI TOO LONG flag 141 is set at process block 178.

It should be apparent from the above description that the present invention enables the user to provide a real time interrupt of the conventional programmable controller functions and an interrupt routine which is executed during each such interrupt. In addition, the interval between real time interrupts may be controlled from within the user's control program. Thus, the interrupt interval may be set at one value when the machine being controlled by the programmable controller is in one state, and it may be set at other values when the machine is in other states.

Because both the real time interrupt rate and the interrupt routine which is executed in response to each interrupt are controlled by the user, the preferred embodiment of the invention also includes means for insuring that enough time is allowed for the normal programmable controller functions to be performed. When the length of time required to execute the interrupt routine exceeds a preestablished portion of the time interval between interrupts, the interrupt time interval is changed. As described above, when the execution of the user's interrupt routine exceeds two-thirds of the user's programmed interrupt time interval, the system waits for an entire interrupt time interval *after* the completion of the user's interrupt routine before producing another real time interrupt. In addition, the user is notified of this even through the RTI LATE FLAG 187 which is set when the interrupt service requires longer than two-thirds of the interrupt interval to execute. As long as the RTI LATE FLAG 187 remains reset, the user can be assured that real time interrupts are occurring at the programmed rate and that the control program is being executed at a rate no worse than three times the scan time with no interrupts.

What is claimed is:

1. In a programmable controller which comprises:
    a memory for storing a user control program comprised of a set of control program instructions and for storing a user interrupt routine comprised of a second set of control program instructions;
    data table means for storing a real time interrupt interval number;
    main processor means coupled to the memory and the data table means for repeatedly executing the user control program to operate a machine connected to the programmable controller, said processor means including means for writing a real time interrupt interval number to the data table means when the processor means executes selected ones of the control program instructions;
    real time clock means coupled to the main processor means and the data table means, which interrupts the execution of the user control program at time intervals determined by the value of the stored real time interrupt interval number;
    wherein the main processor means executes the user interrupt routine each time the user control program is interrupted; and
    in which the real time clock means includes RTI in progress means for establishing the length of time required by the main processor means to execute the user interrupt routine after it is interrupted by the real time clock means, and comparison means for altering the length of time between real time interrupts from that indicated by the real time interrupt interval number when the length of time required by the main processor means to execute the user interrupt routine exceeds a preestablished portion of the interrupt interval indicated by the real time interrupt interval number.

2. The programmable controller as recited in claim 1 in which includes command generation means coupled to the data table means and which periodically reads the real time interrupt interval number from the data table means and writes it to the real time clock means.

3. The programmable controller as recited in claim 1 in which the data table means stores and RTI LATE FLAG which the comparison means sets when it alters the length of time between real time interrupts, the RTI LATE FLAG providing an indication that a preestablished interrupt interval is overriden.

* * * * *